(12) United States Patent
Kim et al.

(10) Patent No.: US 10,774,189 B2
(45) Date of Patent: Sep. 15, 2020

(54) POLYESTER FILM AND MANUFACTURING METHOD THEREFOR, AND POLYESTER MOLD PRODUCT USING SAME AND MANUFACTURING METHOD THEREFOR

(71) Applicant: KOLON INDUSTRIES, INC., Gwacheon-si, Gyeonggi-do (KR)

(72) Inventors: Si Min Kim, Giheung-gu (KR); Dong Jin Kim, Giheung-gu (KR); Yun Jo Kim, Giheung-gu (KR)

(73) Assignee: KOLON INDUSTRIES, INC., Seoul (KR)

( * ) Notice: Subject to any disclaimer, the term of this patent is extended or adjusted under 35 U.S.C. 154(b) by 744 days.

(21) Appl. No.: 15/302,303

(22) PCT Filed: Apr. 10, 2015

(86) PCT No.: PCT/KR2015/003620
§ 371 (c)(1),
(2) Date: Oct. 6, 2016

(87) PCT Pub. No.: WO2015/156638
PCT Pub. Date: Oct. 15, 2015

(65) Prior Publication Data
US 2017/0022340 A1 Jan. 26, 2017

(30) Foreign Application Priority Data

Apr. 11, 2014 (KR) .................... 10-2014-0043540
Apr. 11, 2014 (KR) .................... 10-2014-0043558

(51) Int. Cl.
| | |
|---|---|
| *C08J 5/18* | (2006.01) |
| *C08L 67/02* | (2006.01) |
| *B32B 27/36* | (2006.01) |
| *B32B 3/30* | (2006.01) |
| *B32B 27/08* | (2006.01) |
| *B32B 7/12* | (2006.01) |
| *B32B 27/30* | (2006.01) |
| *B32B 15/09* | (2006.01) |
| *C08G 63/183* | (2006.01) |
| *C08L 67/03* | (2006.01) |
| *C08G 63/16* | (2006.01) |
| *C08G 63/127* | (2006.01) |
| *B29C 48/08* | (2019.01) |

(Continued)

(52) U.S. Cl.
CPC .............. *C08J 5/18* (2013.01); *B05D 7/5883* (2013.01); *B29C 48/0018* (2019.02); *B29C 48/0021* (2019.02); *B29C 48/022* (2019.02); *B29C 48/08* (2019.02); *B29C 48/91* (2019.02); *B29C 55/005* (2013.01); *B29C 55/12* (2013.01); *B29C 66/45* (2013.01); *B29C 66/742* (2013.01); *B32B 3/30* (2013.01); *B32B 7/12* (2013.01); *B32B 15/09* (2013.01); *B32B 27/08* (2013.01); *B32B 27/304* (2013.01); *B32B 27/36* (2013.01); *B32B 37/10* (2013.01); *B32B 37/182* (2013.01); *B32B 38/00* (2013.01); *C08G 63/183* (2013.01); *C08L 67/02* (2013.01); *B29K 2067/00* (2013.01); *B29K 2667/00* (2013.01); *B29K 2705/00* (2013.01); *B32B 38/0012* (2013.01); *B32B 2250/02* (2013.01); *B32B 2255/10* (2013.01); *B32B 2255/205* (2013.01); *B32B 2255/26* (2013.01); *B32B 2255/28* (2013.01); *B32B 2307/50* (2013.01); *B32B 2307/514* (2013.01); *B32B 2307/54* (2013.01); *B32B 2307/72* (2013.01); *B32B 2307/732* (2013.01); *B32B 2307/734* (2013.01); *B32B 2311/00* (2013.01); *B32B 2367/00* (2013.01); *B32B 2419/00* (2013.01); *B32B 2439/66* (2013.01); *B32B 2451/00* (2013.01); *B32B 2457/00* (2013.01); *C08G 63/127* (2013.01); *C08G 63/16* (2013.01); *C08J 2367/02* (2013.01); *C08L 67/03* (2013.01); *C08L 2203/16* (2013.01); *C08L 2205/02* (2013.01); *C08L 2205/06* (2013.01); *Y10T 428/26* (2015.01); *Y10T 428/269* (2015.01); *Y10T 428/31786* (2015.04)

(58) Field of Classification Search
None
See application file for complete search history.

(56) References Cited

U.S. PATENT DOCUMENTS

| | | | |
|---|---|---|---|
| 7,198,857 B2 | 4/2007 | Kumano et al. | |
| 8,834,990 B2 | 9/2014 | Kim et al. | |

(Continued)

FOREIGN PATENT DOCUMENTS

| | | |
|---|---|---|
| CN | 101151147 A | 3/2008 |
| EP | 1 872 935 A1 | 1/2008 |

(Continued)

OTHER PUBLICATIONS

State Intellectual Property Office of People's Republic of China; Communication dated Sep. 30, 2018 in counterpart Application No. 201580030694.6.
International Searching Authority, International Search Report of PCT/KR2015/003620, dated Jun. 17, 2015. [PCT/ISA/210].
European Patent Office; Communication dated Oct. 9, 2017 in counterpart European application No. 15776344.2.

*Primary Examiner* — Vivian Chen
(74) *Attorney, Agent, or Firm* — Sughrue Mion, PLLC

(57) ABSTRACT

Provided are a polyester film that is usable for protecting a surface of a metal plate of a construction material, a decorative material, an interior material, an electronic product, etc., and a manufacturing method therefor, and a polyester mold product using the same and a manufacturing method therefor, wherein the polyester film has low orientation and low modulus to have excellent moldability.

7 Claims, No Drawings

(51) Int. Cl.
*B29C 48/00* (2019.01)
*B29C 48/91* (2019.01)
*B29C 55/12* (2006.01)
*B29C 55/00* (2006.01)
*B05D 7/00* (2006.01)
*B29C 65/00* (2006.01)
*B32B 37/10* (2006.01)
*B32B 37/18* (2006.01)
*B32B 38/00* (2006.01)
*B29K 67/00* (2006.01)
*B29K 667/00* (2006.01)
*B29K 705/00* (2006.01)

(56) References Cited

U.S. PATENT DOCUMENTS

| | | | | |
|---|---|---|---|---|
| 2004/0260035 | A1* | 12/2004 | Dairanieh | C08L 67/02 |
| | | | | 525/437 |
| 2006/0280959 | A1 | 12/2006 | Kumano et al. | |
| 2007/0026223 | A1* | 2/2007 | Osada | B32B 27/08 |
| | | | | 428/332 |
| 2008/0274316 | A1* | 11/2008 | Griffith | C08K 3/22 |
| | | | | 428/35.7 |
| 2008/0274317 | A1* | 11/2008 | Thompson | C08G 63/183 |
| | | | | 428/35.8 |
| 2009/0123697 | A1* | 5/2009 | Matsui | B29C 55/023 |
| | | | | 428/141 |
| 2009/0311493 | A1* | 12/2009 | Manabe | B29C 55/143 |
| | | | | 428/195.1 |
| 2010/0167016 | A1* | 7/2010 | Manabe | B29C 45/1418 |
| | | | | 428/161 |
| 2011/0123778 | A1 | 5/2011 | Kim et al. | |
| 2011/0172386 | A1 | 7/2011 | Kim et al. | |
| 2011/0177311 | A1* | 7/2011 | Manabe | B32B 27/18 |
| | | | | 428/213 |
| 2014/0037931 | A1* | 2/2014 | Yoo | C08J 5/18 |
| | | | | 428/220 |

FOREIGN PATENT DOCUMENTS

| | | | |
|---|---|---|---|
| JP | 2005-187565 | A * | 7/2005 |
| JP | 2010-221715 | A * | 10/2010 |
| JP | 5191097 | B2 | 4/2013 |
| KR | 10-2010-0008582 | A | 1/2010 |
| KR | 10-2013-0077185 | A | 7/2013 |
| KR | 10-2013-0086026 | A | 7/2013 |
| KR | 102013-07718 | A * | 7/2013 |
| WO | 2005/023521 | A1 | 3/2005 |
| WO | 2008/117842 | A1 | 10/2008 |

* cited by examiner

POLYESTER FILM AND MANUFACTURING METHOD THEREFOR, AND POLYESTER MOLD PRODUCT USING SAME AND MANUFACTURING METHOD THEREFOR

CROSS REFERENCE TO RELATED APPLICATIONS

This application is a National Stage of International Application No. PCT/KR2015/003620 filed Apr. 10, 2015, claiming priorities based on Korean Patent Application Nos. 10-2014-0043540, filed Apr. 11, 2014, and 10-2014-0043558, filed Apr. 11, 2014, the contents of all of which are incorporated herein by reference in their entirety.

TECHNICAL FIELD

The present invention relates to a polyester film that is usable for protecting a surface of a metal plate of a construction material, a decorative material, an interior material, an electronic product, etc., and a manufacturing method therefor, and a polyester mold product using the same and a manufacturing method therefor, wherein the polyester film has low orientation and low modulus to have excellent moldability.

BACKGROUND ART

In general, it is required for a metal plate used in household appliances, electrical components, timber cabinets, furniture, houseware materials, interior construction materials, etc., to have significantly excellent surface property and design property. In order to meet these requirements, various methods are used for surface machining and processing of the metal plate.

As surface machining and processing method of the metal plate used to manufacture the metal plate having excellent surface property and design property, there are two general methods well-known presently.

A first method is a method in which a vinyl chloride film is stacked onto a metal plate body coated with an adhesive, the vinyl chloride film having a transparent polyester film bonded to a surface, and a second method is a method in which a painted metal body is subjected to printing through gravure printing, followed by painting with a transparent paint.

In accordance with recent diversification of design of household appliances, the metal plate body used as an exterior material has various curved shapes, and thus, films stacked to the metal plate body are molded with various curves.

However, unlike the metal plate body, the polyester film which is a polymer causes stress with regard to deformation force that is provided at the time of a molding process, and accordingly, after the metal plate body is molded, an excitation phenomenon is generated, which causes a delamination phenomenon from the metal plate body, and thus, there is difficulty in diversifying shapes of the metal plate body.

Therefore, demand for the polyester film that is applicable to molding of a curved molded body has increased.

DISCLOSURE

Technical Problem

An object of the present invention is to provide a polyester film having low stress with regard to deformation and having excellent moldability so as to be applicable to a curved molded body, and a manufacturing method therefor.

In addition, another object of the present invention is to provide a polyester molded body that is manufactured by using the polyester film and has excellent moldability, and a manufacturing method therefor.

Technical Solution

In one general aspect, there is provided a polyester film including a copolymerized polyester,
wherein 20% tensile modulus (F20) is 8.0 to 14.5 kg/mm$^2$, and 100% tensile modulus (F100) is 11.0 to 21.5 kg/mm$^2$ in a machine direction (MD) and a transverse direction (TD), a modulus variation (A) according to a tensile rate according to Equation 1 below in 20% to 100% of tensile section is 3 to 10 kg/mm$^2$:

$$A=(F100-F20)/0.8 \qquad \text{[Equation 1]}$$

a heat shrinkage of the film in the machine direction (MD) and the transverse direction (TD) after heat treatment at 150° C. for 30 minutes is 2% or less, moldability is 80% or more, and
the film includes 1 to 4.8 mol % of copolymerized component.

In another general aspect, there is provided a manufacturing method for a polyester film including a copolymerized polyester, the manufacturing method including:

a) polymerizing a copolymerized polyester including a copolymerized component;

b) manufacturing a sheet by melt-extruding the copolymerized polyester;

c) manufacturing a film by biaxially stretching the sheet in a machine direction (MD) and a transverse direction (TD), wherein at the time of stretching the film in the machine direction (MD), one-stage stretching is performed, or in the case of multi-stage stretching, a stretching ratio of one stretching section in rear end stretching sections is 60% or more with regard to total stretching sections; and d) heat-treating and relaxing the film.

In another general aspect, there are provided a polyester mold product obtained by molding the polyester film as described above according to any one method of vacuum molding, pressure molding, hot press molding, and die molding, and a manufacturing method therefor.

Advantageous Effects

The polyester film according to the present invention may have low resistance to deformation, such that moldability with regard to various designs may be excellent, and the delamination phenomenon from the metal plate body does not occur even after being molded, and accordingly, die processability of the product may be excellent.

In addition, the polyester film of the present invention has low heat shrinkage, such that it is possible to control wrinkles caused by various forms of processing applied to the polyester film that is adhered to the metal plate body, and defects caused by width shrinkage, thereby having excellent processing stability.

The polyester film according to the present invention may be applied to various shapes of molded bodies due to excellent moldability, film processability, and die processability, and accordingly, it is possible to manufacture molded bodies having an aesthetic appearance.

BEST MODE

Hereinafter, an exemplary embodiment of the present invention is provided to explain the present invention in detail. However, the present invention is not limited thereto.

An exemplary embodiment of the present invention is to provide a polyester film including a copolymerized polyester, wherein 20% tensile modulus (F20) is 8.0 to 14.5 kg/mm², and 100% tensile modulus (F100) is 11.0 to 21.5 kg/mm² in a machine direction (MD) and a transverse direction (TD), a modulus variation (A) according to a tensile rate according to Equation 1 below in 20% to 100% of tensile section is 3 to 10 kg/mm²:

$$A=(F100-F20)/0.8 \quad \text{[Equation 1]}$$

a heat shrinkage of the film in the machine direction (MD) and the transverse direction (TD) after heat treatment at 150° C. for 30 minutes is 2% or less, moldability is 80% or more, and the film includes 1 to 4.8 mol % of copolymerized component.

In addition, in the polyester film according to an exemplary embodiment of the present invention, shrinkage stress in the machine direction (MD) after 100 seconds at 140° C. from an initial load of 6.21 N/mm² is −5.5 to −3.0 N/mm², and shrinkage stress in the machine direction (MD) after 100 seconds at 140° C. from an initial load of 0.65 N/mm² is −0.5 to 1.0 N/mm².

Further, in an exemplary embodiment of the present invention, the polyester film has a melting point ($T_m$) of 240 to 253° C., a plane orientation coefficient of 0.120 to 0.155, and density of 1.384 to 1.397 g/cm³.

In the present invention, the modulus is the most important measure of moldability, and high modulus means that resistance to external deformation is high.

In particular, the 100% tensile modulus (F100) and the 20% tensile modulus (F20) are measures that are closely related with moldability and processability of the film.

For example, when molding a biaxially oriented polyester film by hot press molding and vacuum molding, there is a case where the film is locally stretched by 100% or more near corners or at curved parts of a die. Here, a film of which F100 is high is not stretched in these local portions due to high resistance to deformation, or has concentrated stress, which causes rupture. Otherwise, even though the film is stretched, a delamination phenomenon from a metal body may occur since the film has a tendency to return to an original state due to residual stress.

Meanwhile, a film of which F100 is excessively low has excellent moldability, but is excessively largely stretched in portions in which rapid change in shape is caused, such as the curved part in which stress is concentrated at the time of molding, and accordingly, a film of the curved part has a thin thickness, which easily causes damage to the curved part in a mold product, such that durability may be reduced.

In addition, when the polyester film is used as an exterior material, various forms of processes such as printing, surface hair-line treatment, deposition, hard-coating, adhesive coating, etc., are performed in order to obtain aesthetic appearance, and since these processes involve heat and tension, processing stability of the film is important, and in particular, when dimensional stability is low due to tension, processability may be reduced.

A film of which F20 is excessively low has a sagging phenomenon of the film during printing and adhesive coating processes involving heat and tension, such that it is difficult to perform uniform printing or coating, and the film has severe wrinkle occurrence since it easily sags even by low tension, such that processing may be difficult to be performed.

Meanwhile, the film of which F20 is excessively high has excellent film processability, but reduced moldability of a portion having relatively low deformation at the time of molding, such that an excitation phenomenon of the film from the metal body frequently occurs, which may reduce moldability.

The tensile modulus of the film, for example, F20 and F100, is a factor having a great influence on processability and moldability of the film. As a modulus variation is low in 20% to 100% of tensile section, uniform moldability may be obtained. When a modulus difference between F20 and F100 is excessively large, appearance may not be aesthetic due to non-uniform molding in the molded body having the curved part, and partial rupture of the film may occur, which may reduce molding processability.

In addition, when a modulus difference between F20 and F100 is excessively small, only a portion in which stress is concentrated in the curved part is excessively deformed, such that the curved part in a finished product is easily damaged by external impact, which may reduce product durability.

The modulus (F20) of the film in a machine direction (MD) and a transverse direction (TD) at the time of stretching the film by 20% is 8.0 to 14.5 kg/mm², and more preferably, 9 to 13 kg/mm². When F20 is less than 8 kg/mm², it is difficult to uniformly coat and print at the time of processing the film, and wrinkle occurrence may be severe, such that it is difficult to be used as a product. When F20 is more than 14.5 kg/mm², moldability of the film may be reduced, and in particular, an excitation phenomenon of the film from the metal body frequently occurs in the curved part, such that a product yield is low, which makes it difficult to be applied.

In addition, the modulus (F100) of the film in a machine direction (MD) and a transverse direction (TD) at the time of stretching the film by 100% is 11.0 to 21.5 kg/mm², and more preferably, 13.5 to 19.0 kg/mm². When F100 is less than 11.0 kg/mm², non-uniform deformation between the curved part and a flat part may occur, such that appearance may not be aesthetic, and wrinkle occurrence may be severe. Meanwhile, when F100 is more than 21.5 kg/mm², moldability is reduced, rupture of the film in the curved part frequently occurs, and a delamination phenomenon of the film from the metal body may occur, which makes it difficult to be applied.

The modulus variation (A) according to a tensile rate according to Equation 1 below in 20% to 100% of tensile section with regard to the machine direction (MD) and the transverse direction (TD) of the film is 3 to 10 kg/mm², and more preferably, 4 to 9 kg/mm².

$$A=(F100-F20)/0.8 \quad \text{[Equation 1]}$$

When the modulus variation (A) in the corresponding section is less than 3 kg/mm², only a portion in which stress is concentrated in the curved part is excessively deformed, such that the curved part in a finished product is easily damaged by external impact, which may reduce product durability. When the modulus variation (A) in the corresponding section is more than 10 kg/mm², appearance may not be aesthetic due to non-uniform molding in the molded body having the curved part, and partial rupture of the film may occur, which may reduce molding processability.

In addition, the heat shrinkage of the film in the machine direction (MD) and the transverse direction (TD) after heat treatment at 150° C. for 30 minutes is preferably 2% or less. More preferably, the heat shrinkage is 1.5% or less.

When the heat shrinkage is more than 2.0%, coating and processing uniformity may be reduced due to wrinkle occurrence by heat in a film manufacturing process, which may reduce a process yield.

Further, in the polyester film of the present invention, shrinkage stress in the machine direction (MD) after 100 seconds at 140° C. from an initial load of 6.21 N/mm$^2$ is −5.5 to −3.0 N/mm$^2$, and the shrinkage stress in the machine direction (MD) after 100 seconds at 140° C. from an initial load of 0.65 N/mm$^2$ is −0.5 to 1.0 N/mm$^2$, and more preferably, the shrinkage stress in the machine direction (MD) after 100 seconds at 140° C. from an initial load of 6.21 N/mm$^2$ is −5.0 to −3.5 N/mm$^2$, and the shrinkage stress in the machine direction (MD) after 100 seconds at 140° C. from an initial load of 0.65 N/MV is 0 to 0.7 N/mm$^2$.

When the shrinkage stress in the machine direction (MD) after 100 seconds at 140° C. from the initial load of 6.21 N/mm$^2$ is less than −5.5 N/mm$^2$, and the shrinkage stress from the initial load of 0.65 N/mm$^2$ is less than −0.5 N/mm$^2$, the sagging phenomenon of the film by heat and tension applied to the film during the film processing may be severe, such that printing and coating uniformity may be reduced, and wrinkle occurrence may be large, which makes it difficult to be applied. When the shrinkage stress in the machine direction (MD) after 100 seconds at 140° C. from the initial load of 6.21 N/mm$^2$ is more than −3.0 N/mm$^2$, and the shrinkage stress from the initial load of 0.65 N/mm$^2$ is more than 1.0 N/mm$^2$, valley wrinkles due to shrinkage of the film in the transverse direction (MD) may be severe, which makes it difficult to be applied.

In addition, a melting point ($T_m$) is 240 to 253° C., and more preferably, 242 to 248° C. When the melting point ($T_m$) is less than 240° C., yellowing of the polyester film may occur by high temperature heat applied in a process in which the polyester film bonded to a vinyl chloride film is laminated with a metal body, such that appearance may be poor. When a temperature for the lamination process is decreased to prevent the yellowing, adhesion force between the vinyl chloride film and the metal body is deteriorated, such that it is difficult for the lamination process to be performed. In addition, when the melting point ($T_m$) is more than 253° C., the polyester film is brittle in the process in which the polyester film bonded to a vinyl chloride film is laminated with the metal body, such that it is difficult to perform uniform pressing in a roller pressing process, which may cause a problem that adhesion between the vinyl chloride film and the metal body appears non-uniform.

In addition, a plane orientation coefficient is 0.120 to 0.155, and more preferably, 0.130 to 0.145. When the plane orientation coefficient is less than 0.120, deformation occurrence by tension at the time of a film manufacturing process may be severe, such that it may be difficult to control a thickness. When the plane orientation coefficient is more than 0.155, a degree of orientation of the film is high, which may reduce moldability.

Further, a density is 1.384 to 1.397 g/cm$^2$, and more preferably, 1.388 to 1.395 g/cm$^2$. When the density is less than 1.384 g/cm$^2$, a degree of order of polymer chains is excessively reduced, such that thermal stability is low, and thus, shrinkage by heat largely occurs in the film processing, which reduces processability. When the density is more than 1.397 g/cm$^3$, the film is excessively brittle, which may reduce moldability.

The present inventors found that within the ranges at which the modulus, the heat shrinkage, the shrinkage stress, the melting point, the plane orientation coefficient, and the density are satisfied, there are no wrinkle occurrences at the time of the film processing in which heat and tension are applied, and uniform coating processability may be secured, and further, excellent moldability may be secured even in a largely curved molded body at the time of laminating with the metal body and then molding in a die. Further, the present inventors found that all of physical properties could be satisfied by stretching the film under specific conditions at the time of manufacturing a film as a predetermined polyester resin, and completed the present invention.

That is, the polyester film of the present invention may include 1 to 4.8 mol % of copolymerized component. When the copolymerized component is used in an amount less than 1 mol %, orientation regularity of the polymer chains is deteriorated, such that an effect of reducing modulus is not significant, and thus, it may be difficult to improve moldability. When the copolymerized component is used in an amount more than 4.8 mol %, rupture may occur during heat treatment due to reduction in stability by heat at the time of manufacturing the film, such that film manufacturing processability may be reduced, and it may be difficult to control shrinkage.

Therefore, the modulus, the heat shrinkage, the shrinkage stress, the melting point, the plane orientation coefficient, and the density may be satisfied at the ranges at which the composition is satisfied.

The copolymerized polyester includes an aromatic dicarboxylic acid component, ethylene glycol, and at least any one glycol selected from the group consisting of branched aliphatic glycol and alicyclic glycol as the copolymerized component.

As the aromatic dicarboxylic acid component, terephthalic acid, isophthalic acid, naphthalenedicarboxylic acid or derivatives for forming esters thereof are suitable. A terephthalic acid unit has 70 mol % or more, preferably, 85 mol % or more, particularly preferably 95 mol % or more, and particularly preferably 100 mol % with regard to a total amount of the dicarboxylic acid component.

In addition, as the branched aliphatic glycol, for example, neopentyl glycol, 1,2-propanediol, 1,3-propanediol, 1,4-butanediol, etc., may be used. As the alicyclic glycol, 1,4-cyclohexanedimethanol, tricyclodecanedimethylol, etc., may be used.

More preferably, the copolymerized component may be neopentyl glycol in consideration of reaction uniformity and easiness in controlling a molecular weight at the time of copolymerization.

An amount of the copolymerized component in the copolymerized polyester may be controlled in consideration of film manufacturing processability and physical properties within a range at which the polyester film includes 1 to 4.8 mol % of copolymerized component.

In addition, at the time of manufacturing the film of the present invention, a mixture of the copolymerized polyester and a homo polyester may be used. In this case, it is preferred that the copolymerized component in the copolymerized polyester has an amount of 8 to 25 mol %, wherein a mixed ratio of the copolymerized polyester and the homo polyester is not largely limited as long as it is within a range at which the copolymerized component in the film has an amount of 1 to 4.8 mol %, but it is preferred that the mixed ratio of the copolymerized polyester and the homo polyester is 4 to 60 wt %: 96 to 40 wt %.

As a catalyst used to prepare the copolymerized polyester, for example, an alkaline earth metal compound, a manganese compound, a cobalt compound, an aluminum compound, an antimony compound, a titanium compound, a titanium/silicon complex oxide, a germanium compound, etc., may be used. Among them, the titanium compound, the antimony compound, the germanium compound, and the aluminum compound are preferred in view of catalytic activity.

At the time of preparing the copolymerized polyester, it is preferred to add a phosphorus compound as a heat stabilizer. As the phosphorus compound, for example, phosphoric acid, phosphorous acid, etc., are preferred.

The copolymerized polyester preferably has an intrinsic viscosity of 0.58 dl/g or more, more preferably, 0.62 dl/g or more, and particularly preferably 0.67 dl/g or more in view of moldability, adhesion property, and film-forming stability. When the intrinsic viscosity is less than 0.58 dl/g, moldability tends to be reduced. In addition, when a filter for removing foreign materials is installed in a melt line, an upper limit of the intrinsic viscosity is preferably 0.9 dl/g in view of discharge stability at the time of extruding a molten resin.

The polyester film may have a total thickness of 10 to 100 μm. When the thickness of the film is less than 10 μm, the film may be easily damaged by external impact since a thickness after molding is excessively thin, such that the film may not act as an exterior material. When the thickness of the film is more than 100 μm, the film may act as a protective layer to external impact, but it is difficult to mold the curved part, which may be difficult to be applied.

In addition, the polyester film may further include 100 to 1500 ppm of inorganic particles or organic particles as needed.

In an exemplary embodiment of the present invention, the polyester film may have a surface concave-convex formed on at least any one surface by hair-line processing in order to obtain a beautiful appearance and visual effect. The hair-line processing may be performed by using a sand paper or a roll having concave-convex, and a hair line depth is preferably 0.7 to 1 μm.

In addition, the polyester film may have a coating film with a high hardness, or may have a hard coating layer, in order to increase surface hardness and improve scratch resistance. The hard coating layer usable in the present invention is not specifically limited, but may be urethane-based, epoxy-based, ester-based, ether-based, melamine-based, acrylic, silicone-based hard coating agent, etc. The acrylic hard coating layer is preferred since a solid hard coating film is obtained.

In the acrylic hard coating layer according to the present invention, the coating layer may have a thickness of 2 to 3 μm by coating a polyurethane acrylate composition having a solid content of 20 to 40% diluted in methyl ethyl ketone (MEK).

Next, a manufacturing method for a polyester film according to the present invention is described.

The manufacturing method for a polyester film may include:

a) polymerizing a copolymerized polyester including a copolymerized component;

b) manufacturing a sheet by melt-extruding the copolymerized polyester;

c) manufacturing a film by biaxially stretching the sheet in a machine direction (MD) and a transverse direction (TD), wherein at the time of stretching the film in MD, one-stage stretching is performed, or in the case of multi-stage stretching, a stretching ratio of one stretching section in rear end stretching sections is 60% or more with regard to total stretching sections; and d) heat-treating and relaxing the film.

The copolymerized polyester in step a) may be polymerized by including an aromatic dicarboxylic acid component, ethylene glycol, and at least any one glycol selected from the group consisting of branched aliphatic glycol and alicyclic glycol as the copolymerized component, and may be prepared by general polymerization methods for polyester.

The copolymerized polyester preferably has an intrinsic viscosity of 0.58 dl/g or more, more preferably, 0.62 dl/g or more, and particularly preferably 0.67 dl/g or more in view of moldability, adhesion property, and film-forming stability. When the intrinsic viscosity is less than 0.58 dl/g, moldability tends to be reduced. In addition, when a filter for removing foreign materials is installed in a melt line, an upper limit of the intrinsic viscosity is preferably 0.9 dl/g in view of discharge stability at the time of extruding a molten resin.

In step c), a heat strain, a plane orientation coefficient, and a shrinkage stress of the film may be controlled within the range of the present invention through molecular orientation by biaxially stretching a non-stretched sheet, such that the biaxially stretching is very important in the manufacturing process for the film of the present invention. As a biaxial stretching method, a method in which the non-stretched sheet is stretched and heat treated in a machine direction (MD) and a transverse direction (TD) of a film, thereby obtaining a biaxially stretched film having a degree of orientation of a desired film, is employed. Among various manners thereof, a successive biaxial stretching manner such as an MD/TD method including stretching in MD, followed by stretching in TD, or a TD/MD method including stretching in TD, followed by stretching in MD, etc., and a simultaneous biaxial stretching manner in which stretching in MD and stretching in TD are simultaneously performed, are preferred in view of a film quality. In addition, in the simultaneous biaxial stretching method, a tenter driven by a linear motor may be used. Further, a multi-stage stretching method in which stretching in the same direction is divided in multi-stages may be used as needed.

At the time of the biaxial stretching, the film is preferably stretched in MD and TD by 2.5 to 5.0 times, and particularly preferably, 3.3 to 4.0 times. Meanwhile, in this case, stretching in MD may be larger than stretching in TD and vice versa, and the stretching in MD may be the same ratio as the stretching in TD. It is more preferred that the stretching in MD is performed by 3.0 to 3.8 times, and the stretching in TD is performed by 3.5 to 4.3 times.

Here, at the time of stretching the film in a machine direction (MD), one-stage stretching is preferred. In the case of multi-stage stretching including two or more-stage stretching, it is preferred that a stretching ratio of one stretching section in rear end stretching sections is 60% or more with regard to total stretching sections.

In the two-stage stretching, there are three total stretching rolls, and the one-stage stretching may be performed between stretching rolls 1 and 2 due to a difference in peripheral speed, and continuously, the two-stage stretching may be performed between stretching rolls 2 and 3 due to a difference in peripheral speed. Here, the rear end stretching section means a two-stage stretching section, and the stretching may be performed so that a stretching ratio of this section is 60% or more with regard to the total stretching sections.

In three-stage stretching, there are four total stretching rolls, and the one-stage stretching may be performed between stretching rolls 1 and 2 due to a difference in peripheral speed, and continuously, the two-stage stretching may be performed between stretching rolls 2 and 3 due to a difference in peripheral speed, and lastly, the three-stage stretching may be performed between stretching rolls 3 and 4 due to a difference in peripheral speed. Here, the rear end stretching section means a two-stage stretching section or a three-stage stretching section, and the stretching may be performed so that a stretching ratio of the two-stage stretching section or the three-stage stretching section is 60% or more with regard to the total stretching sections.

In four-stage stretching, there are five total stretching rolls, and the one-stage stretching to the four-stage stretching may be continuously performed between stretching rolls due to a difference in peripheral speed according to the same principle as above. Here, the rear end stretching section means a three-stage stretching section or a four-stage stretching section, and the stretching may be performed so that a stretching ratio of the three-stage stretching section or the four-stage stretching section is 60% or more with regard to the total stretching sections.

Here, the stretching ratio for each stretching section with regard to the total stretching sections may be calculated by dividing a length deformation amount of a film in MD for each stretching section by a total length deformation amount with regard to the film in MD, and may be simply obtained by Equation 2 below:

stretching ratio for stretching section=[(a length deformation amount for stretching section)/(total length deformation amount)]×100(%)  [Equation 2]

For example, when one-stage stretching ratio is 1.5, a two-stage stretching ratio is 1.5, and a three-stage stretching ratio is 2.0 in the three-stage stretching, a total stretching ratio is 4.5 which is obtained by multiplication of stretching ratios of each stretching section. In addition, when it is assumed that a length of the film in MD before stretching is 100, a length of the final film in MD after the stretching in MD is completed is 450, and a length deformation amount of the film in MD is 350.

When the length deformation amount of the film for each stretching section in MD is calculated on the basis of the above-description, in the case of the film after one-stage stretching, the length in MD is "100×1.5=150" according to "100×one-stage stretching ratio", and the deformation amount in the one-stage stretching section may be calculated by "a length after one-stage stretching–a length before one-stage stretching", which is 50 according to calculation "150–100=50", and the stretching ratio of one-stage stretching section with regard to a total stretching ratio is "50/350" according to calculation "a length deformation amount by one-stage stretching/total length deformation amount", and the stretching ratio of one-stage stretching section with regard to the total stretching sections is 14.3%.

According to the continuous two-stage stretching section, the film is deformed in MD again. The length of the film in MD after the two-stage stretching may be calculated by "100×one-stage stretching ratio×two-stage stretching ratio", which is "100×1.5×1.5=225", and the deformation amount of the film in MD after the two-stage stretching may be calculated by "a length after two-stage stretching–a length after one-stage stretching", which is "225–150=75", and the stretching ratio of the two-stage stretching section with regard to the total stretching sections is "75/350" according to calculation "a length deformation amount by two-stage stretching/total length deformation amount", and the stretching ratio of the two-stage stretching section is 21.4%.

Lastly, according to the three-stage stretching section, the film is deformed in MD again. The length of the film in MD after the three-stage stretching may be calculated by "100× one-stage stretching ratio×two-stage stretching ratio×three-stage stretching ratio", which is "100×1.5×1.5×2.0=450", and the deformation amount of the film in MD after the three-stage stretching may be calculated by "a length after three-stage stretching–a length after two-stage stretching", which is "450–225=225", and the stretching ratio of the three-stage stretching section with regard to the total stretching sections is "225/350" according to calculation "a length deformation amount by three-stage stretching/total length deformation amount", and the stretching ratio of the three-stage stretching section with regard to the total stretching sections is 64.3%.

In the multi-stage stretching including two or more-stage stretching, when the stretching ratio of one stretching section among the rear end stretching sections with regard to total stretching sections is less than 60%, wrinkles may excessively occur in a film machine direction due to stretching non-uniformity, and pressed marks by a nip-roll may occur in a film transverse direction, such that appearance may be poor, and processability may be reduced, which may be difficult to be applied as a product.

Therefore, the stretching ratio of one stretching section among the rear end stretching sections in the multi-stage stretching including two or more-stage stretching is preferably 60% or more, more preferably 70% or more, and the most preferably 80% or more with regard to the total stretching sections.

A stretching temperature at which the film is stretched in MD is preferably 80° C. to 130° C. When the stretching temperature is less than 80° C., stretching stress is increased and orientation of the film in MD is increased, such that it may be difficult to implement desired physical properties. The orientation largely occurs, such that at the time of stretching the film in TD, rupture may be severe, such that processability may be reduced. In addition, when the stretching temperature is more than 130° C., stretching stress is low, which may reduce modulus, but film thickness uniformity may be reduced, and pressed marks by a nip-roll may severely occur and appearance may be poor, which may be difficult to be applied.

After the biaxial stretching, heat-treating (heat-setting) and relaxing of the film may be performed in step (d).

A temperature for heat-treating the film is preferably performed at 220° C. to 245° C. When the temperature for heat treatment is less than 220° C., shrinkage and shrinkage stress of the film in MD are high, such that at the time of subsequent processes such as hard-coating and adhesive coating processes, etc., wrinkles may excessively occur due to excessive tension and shrinkage, which may be difficult to be applied. When the temperature for heat treatment is more than 245° C., it may be difficult to manufacture the film since film rupture excessively occurs.

A relaxation rate of the film is preferably performed at 1 to 10%. When the relaxation rate is less than 1%, shrinkage of the film in TD is high, such that it may be difficult to perform uniform coating since wrinkles excessively occur at the time of subsequent processes. When the relaxation rate is more than 10%, a film sagging phenomenon occurs in a tenter during the film manufacturing process, and thus, scratches may occur on surface of the film, resulting in poor appearance, which may be difficult to be applied. A temperature for relaxing the film is preferably performed at 150° C. to 245° C.

The scope of the present invention includes a polyester mold product obtained by molding the polyester film according to any one method of vacuum molding, pressure molding, hot press molding, and die molding, wherein the polyester film is manufactured by the manufacturing method therefor.

More specifically, the polyester mold product may be a stacked body including the polyester film or a laminate of the polyester film and a metal plate.

More specifically, the manufacturing method for a polyester mold product according to the present invention may include:

1) forming a surface concave-convex on one surface of the polyester film by hair-line processing, the polyester film manufactured by the manufacturing method including steps a) to d);

2) forming a primer coating layer on a surface on which the surface concave-convex is formed, and then forming a metal deposition layer;

3) forming a hard coating layer on a surface opposite to the formed metal deposition layer of the film;

4) forming a primer coating layer on the metal deposition layer of the film, and then laminating the primer coating layer with a polyvinyl chloride (PVC) film; and 5) pressing and laminating the polyvinyl chloride (PVC) film layer and a metal plate at a high temperature.

In the present invention, the metal plate may further include an anti-oxidation plating layer on a surface facing the polyvinyl chloride (PVC) film layer. The anti-oxidation plating layer is formed to prevent corrosion of the metal plate, wherein zinc oxide, magnesium, aluminum, chromium, etc., may be plated thereon. Here, in order to further improve adhesion force between the metal plate and the polyvinyl chloride (PVC) film, an adhesive layer may be further included on the anti-oxidation plating layer. The adhesive layer may be formed at a thickness of 2 to 10 μm by using a polyolefin-based hot-melt adhesive, a polyurethane-based hot-melt adhesive, an epoxy-based adhesive, etc.

In the manufacturing method for the polyester mold product of the present invention, step 1) is to form the surface concave-convex on one surface of the polyester film by hair-line processing in order to obtain a beautiful appearance and visual effect in a final product, wherein the hair-line processing may be performed by using a sand paper or a roll having concave-convex, and a hair line depth is preferably 0.7 to 1 μm.

Next, step 2) is to form the primer coating layer on a surface on which the surface concave-convex is formed in order to easily form the metal deposition layer, and then forming the metal deposition layer. By forming the metal deposition layer, aesthetic property may be more improved due to metal gloss.

Here, the primer coating layer may be formed at a thickness of 0.1 to 1.0 μm by using a polyurethane-based resin, a polyacrylic resin, a silicone-based resin, an acrylic urethane-based resin, etc.

In addition, examples of the metal usable in forming the metal deposition layer may include Al, Zn, Mg, Sn, Ti, In, Cr, Ni, Cu, Pb, Fe, etc., preferably, Al, Zn, Mg, and in particular, Al may be the most preferred in view of productivity.

A method for forming the metal deposition layer is not particularly limited, but may be physical deposition methods such as a vacuum deposition method, a sputtering method, an ion plating method, etc., or chemical deposition methods (CVD), etc.

A film thickness of the metal deposition layer is formed so that optical density is 0.40 to 0.80, which is preferred that appearance is beautiful, and a hair-line processing effect may be maximized.

Next, step 3) is to form the coating film with a high hardness, or to form the hard coating layer on the surface opposite to the formed metal deposition layer of the film, in order to increase surface hardness and improve scratch resistance. The hard coating layer usable in the present invention is not specifically limited, but may be urethane-based, epoxy-based, ester-based, ether-based, melamine-based, acrylic, silicone-based hard coating agent, etc. The acrylic hard coating layer is preferred since a solid hard coating film is obtained.

In the acrylic hard coating layer according to the present invention, the coating layer may have a thickness of 2 to 3 μm by coating a polyurethane acrylate composition having a solid content of 20 to 40% diluted in methyl ethyl ketone (MEK).

Next, step 4) is to form the primer coating layer on the metal deposition layer of the film, and then laminate the primer coating layer with the polyvinyl chloride (PVC) film, wherein the polyvinyl chloride film is formed to protect the metal deposition layer and improve durability and weather resistance of the metal plate.

The primer coating layer on the metal deposition layer usable in the present invention is not particularly limited, but may be formed of polyurethane-based, ester-based, epoxy-based resin, etc. Coating methods using a comma coater, a gravure coater, etc., may be applied to form the coating layer having a thickness of 2 to 15 μm, and then the coating layer may be laminated with the polyvinyl chloride (PVC) film. Then, the laminated sheet may be subjected to aging at a temperature of 50 to 70° C. for 72 to 120 hours, thereby improving adhesion force of the laminated sheet.

Next, step 5) is to press and laminate the polyvinyl chloride (PVC) film layer and the metal plate at a high temperature. Here, the adhesive layer may be further included on the metal plate in order to increase adhesive force between the polyvinyl chloride (PVC) film and the metal plate, wherein the adhesive layer may be formed of a polyolefin-based hot-melt adhesive, a polyurethane-based hot-melt adhesive, an epoxy-based adhesive, etc., and the adhesive layer may be formed at a thickness of 2 to 10 μm.

The metal plate is heated by passing the metal plate through an oven at a high temperature, and pressed and laminated with the polyvinyl chloride (PVC) film layer, wherein a temperature for heating the metal plate is preferably 200 to 240° C.

Hereinafter, Examples of the present invention will be provided for a detailed description of the present invention. However, the present invention is not limited to the following Examples.

Hereinafter, physical properties were measured by the following methods.

1) 20% Tensile Modulus (F20)

Two measurement samples each having a size of "300 mm×300 mm", wherein a longitudinal direction is set as a machine direction (MD) of a film, and a horizontal direction is set as a transverse direction (TD) of the film within a length range of 2 m in MD of a film roll, were taken. One of the taken measurement samples was cut into a size of 300 mm×15 mm (a length in MD×a length in TD) to prepare a sheet for measuring physical properties, and then, 10 sheets for measuring physical properties in MD except for outermost parts in TD were taken. In addition, the other one of the taken measurement samples was cut into a size of 300 mm×15 mm (a length in TD×a length in MD) to prepare a sheet for measuring physical properties, and then, 10 sheets for measuring physical properties in TD except for outermost parts in MD were taken.

Strength and elongation of the film in MD and in TD were measured 10 times, respectively, by using a universal tensile testing machine (Instron Co., Tensile Test Machine) wherein a width of the measurement sample is 15 mm, a gauge length is 50 mm, and a cross head-up speed is 500 mm/min.

Strength values at a time point of 20% tension in MD were confirmed from a stress-strain curve of the films in MD, and an average strength value at 20% tensile in MD for 10 measurement samples was calculated and determined as 20% tensile modulus (F-20) of the film in MD.

In addition, strength values at a time point of 20% tension in TD were confirmed from a stress-strain curve of the film in TD, and an average strength value at a time point of 20% tension in TD for 10 measurement samples was calculated and determined as 20% tensile modulus (F-20) of the film in TD.

2) 100% Tensile Modulus (F100)

Strength values at a time point of 100% tension were confirmed from a stress-strain curve of the films in MD and TD of the measurement samples of 1) above, and average strength values at a time point of 100% tension in MD and TD for 10 measurement samples were calculated and determined as 100% tensile modulus (F-100) of the film in MD and 100% tensile modulus (F-100) of the film in TD, respectively.

3) Heat Shrinkage

A film roll was cut into a size of 200 mm×200 mm in a forward direction with regard to the film in MD and TD, and lengths of the film in MD and TD were measured. Then, the film was subjected to heat shrinkage at a non loading state in an oven at 150° C. for 30 minutes. Then, lengths of the heat-shrunk film in MD and TD were measured to calculate heat shrinkage of the film in MD and TD according to Calculation Formula 1 below.

$$\text{heat shrinkage (\%)} = \frac{\text{(length before shrinkage} - \text{length after shrinkage)}}{\text{length before shrinkage}} \times 100 \quad \text{[Calculation Formula 1]}$$

4) Shrinkage Stress

A film roll was cut into two rectangular shaped samples having a size of 500 mm×10 mm and a size of 10 mm×500 mm in MD and in TD, respectively, and the samples for measuring shrinkage stress in MD and TD were taken.

Shrinkage stress for each initial load with regard to the film in MD and TD was measured after 100 seconds at 140° C. from initial load of 0.65 N/mm² and 6.21 N/mm², respectively, by using a Testrite MKV Shrinkage-Force Tester (Testrite Ltd.). The obtained shrinkage stress was divided into a cross-sectional area of the sample to calculate a shrinkage stress according to initial load by using Calculation Formula 2 below.

At the time of measuring the shrinkage stress of the film in MD and in TD, a width of the sample was 10 mm, and the cross-sectional area was calculated by multiplying a thickness of the measurement sample and the width (10 mm) of the measurement sample.

Shrinkage stress (N/mm²)=measured value of shrinkage stress (N)/cross-sectional area of the sample (width×thickness; mm²)    [Calculation Formula 2]

For example) the measured value of shrinkage stress: 1.5 N the cross-sectional area of the sample: 0.3 mm² (a case where a sample width is 10 mm and a sample thickness is 30 μm)

shrinkage stress (N/mm²)=1.5/0.3=5

5) Melting Point ($T_m$)

A melting temperature was measured at a scan speed of 20° C./min by using a differential scanning calorimetry (DSC, Perkin-Elmer 7 series thermal analysis system).

6) Plane Orientation Coefficient

Four measurement samples each having a size of 50 mm×15 mm in MD and TD from the central part on the basis of a film roll in TD were taken. Each refractive index of the film in MD and TD and refractive indexes of the film in a thickness direction were measured by using a Prism Coupler (Model: 2010/M manufactured by Metricon Co.).

The refractive index ($R_x$) of the film in MD and the refractive index ($R_y$) of the film in TD were measured, respectively, by using a Laser 632.8 nm He—Ne with a bulk thickness type and a transverse electric (TE) mode, and a thickness direction refractive index ($R_{xz}$) in MD and a thickness direction refractive index ($R_{yz}$) in TD were measured, respectively, by using the laser with TM mode.

The respective measured refractive indexes were used to calculate a plane orientation coefficient according to Calculation Formula 3 below:

$$\text{Plane orientation coefficient}(C_f) = [(R_x + R_y)/2 - (R_{xz} + R_{yz})/2] \quad \text{[Calculation Formula 3]}$$

in the Calculation Formula, $C_f$ is a plane orientation coefficient, $R_x$ is a refractive index in MD, $R_y$ is a refractive index in TD, $R_{xz}$ is a refractive index in Z-axis direction (thickness direction) in MD, and $R_{yz}$ is a refractive index in Z-axis direction (thickness direction) in TD.

7) Density

The film was put into a densimeter configured of normal heptane and carbon tetrachloride mixed solvent (Shibayama Inc., Japan, Model: SS), and left at 23° C. for one day. Then, a density (p) of the film was measured.

8) Film Appearance

Appearances of the films manufactured by Examples and Comparative Examples were observed by the naked eye, and a case where wrinkles occur in MD or pressed marks by a nip-roll occur in TD was judged as 'defective', and a case where the defects do not occur was judged as 'good'. In the evaluation for film appearance, it is difficult to use the 'defective' cases as a normal product, and as a result, film-forming processability is reduced.

9) Coating Processability

In order to evaluate processability for the coating process with regard to the polyester films of Examples and Comparative Examples, an acrylic urethane resin composition was coated at a thickness of 1 μm on one surface of the film by using a micro gravure coater, and dried by passing through a drying oven at 130° C. for a residence time of 40 seconds. After the drying process, coating processability was calculated by confirming shrinkage of the film in TD and whether wrinkles occur. The processability is a factor related to a product yield, and as the shrinkage in TD is large, the product yield is reduced, and when wrinkles occur in the film, it is difficult to be used as a product, such that yield is reduced. Therefore, the processability was measured with complex values of these two factors.

Accordingly, for evaluating the processability, the polyester films of Examples and Comparative Examples were manufactured in a length of 6,000 m and a width of 1,200 mm, followed by a coating process, and a length of the film in TD was measured to measure a length maintenance rate in TD.

Further, the wound film after coating process was divided into 40 sections, wherein the film had a total length of 4,000 m except for 1,000 m of an initial part and 1,000 m of an end part, and each section had a length of 100 m. Whether wrinkles occur was confirmed for each section. A case where a wrinkle occurs in the length of 100 m was judged as 'defective', and a case where a wrinkle does not occur was judged as 'good', and a ratio of the sections judged as 'good' in total 40 sections was calculated to measure stability in wrinkle occurrence.

Coating processability was calculated according to Calculation Formula 4 below by using the length maintenance rate in TD and the stability in wrinkle occurrence as obtained above:

Coating processability (%)=[stability in wrinkle occurrence×length maintenance rate in TD]/100     [Calculation Formula 4]

in this Formula, the calculation factor of the above formula was calculated as follows.

Stability in wrinkle occurrence (%)=[(the number of sections in which wrinkle occurrence is good/40)]×100

Length maintenance rate (%) in TD=[(length of film in MD after coating, mm)/1,200]×100

10) Moldability

The polyester films of Examples and Comparative Examples were subjected to hair-line processing, wherein the number of lines is 55/cm, and a depth is 0.8 µm. Then, a coating layer was formed at a thickness of 0.5 µm on a surface of the hair-line processing, and an aluminum metal deposition layer having an optical density (OD) of 0.50 was formed thereon. An adhesive layer having a thickness of 0.5 µm was coated on the metal deposition layer, and a hard coating layer having a thickness of 2.5 µm was formed on an opposite surface to the formed metal deposition layer, and a polyvinyl chloride (PVC) film having a thickness of 100 µm and the adhesive layer of the metal deposition surface were laminated at 90° C. to manufacture a polyester mold product.

The polyester mold product and a metal plate coated with an adhesive and heated at 235° C. were pressed by a roller, thereby manufacturing a sheet-laminated metal plate laminated with the polyester mold product. Whether or not the polyester mold product was torn was confirmed by cup-shaped deformation having a height of 10 mm in a direction of the polyester mold product from the metal plate body at a rate of 15 rpm by using an Erichsen Cupping Tester, wherein a case where tear of the polyester mold product occurs was judged as 'defective', and a case where the tear of the polyester mold product does not occur was judged as 'good'.

After the Erichsen Cupping Test on 100 sheet-laminated metal plates laminated with the polyester mold product, the number of cases judged as 'good' in which the tear of the polyester mold product does not occur was confirmed to calculate moldability according to Calculation Formula 5 below:

Moldability (%)=(the number of samples judged as good/100)×100     [Calculation Formula 5]

11) Intrinsic Viscosity 0.4 g of PET pellets (sample) was added to 100 ml of a reagent in which phenol is mixed with 1,1,2,2-tetrachloro ethanol at a weight ratio of 6:4, the mixture was dissolved for 90 minutes, then transferred to an Ubbelohde viscometer, and maintained in a constant temperature bath of 30° C. for 10 minutes. Then, a falling time (sec) of the solution was calculated by using a viscometer and an aspirator. A falling time of the solvent was measured by the same method, and R.V value and I.V value were calculated by Calculation Formulas 6 and 7 below.

In the following Calculation Formulas, C represents a concentration of a sample.

$$R.V = \frac{\text{Falling time of sample}}{\text{Falling time of solvent}}$$     [Calculation Formula 6]

$$I.V = \frac{1/(R.V-1)}{C} + \frac{3}{4}\ln\left(\frac{R.V}{C}\right)$$     [Calculation Formula 7]

Example 1

A copolymerized polyester chip including, as components, 100 mol % terephthalic acid unit as an aromatic dicarboxylic acid component, 98.8 mol % ethylene glycol unit as a diol component, and 1.2 mol % neopentyl glycol unit, and having an intrinsic viscosity of 0.65 dl/g, was manufactured.

The chip was melted in an extruder at 280° C., extruded through a T-die, rapidly cooled and solidified on a cooling roller having a surface temperature of 20° C., and simultaneously, the chip was allowed to be in close contact with a cooling roller by using a static electricity application method, thereby obtaining an amorphous non-stretched sheet.

The non-stretched film passed through a pre-heat roller, and was subjected to two-stage stretching, wherein total stretching of the film in MD was performed by 3.0 times, and then cooled in a cooling roller at 23° C. In stretching the film in MD, there were 2 stretching sections, wherein the pre-heat non-stretched film was subjected to one-stage stretching at 110° C. by 1.5 times, and continuously, two-stage stretching at 113° C. by 2.0 times. The film was cooled in a cooling roller at 23° C. immediately after the two-stage stretching. Here, a stretching ratio of the two-stage stretching section which is a rear end stretching section was 75% with regard to total stretching sections.

Then, the uniaxially stretched film was pre-heated in a tenter at 108° C. for 1.9 seconds, and stretched in TD at 140° C. by 4.0 times, followed by heat-setting at 242° C., and relaxing at a relaxation temperature of 220° C. in TD to perform relaxation treatment by 9.5%, thereby obtaining a biaxially stretched polyester film having a thickness of 16 µm.

Physical properties of the manufactured polyester film were measured and shown in Table 3 below. Further, appearance of the manufactured film was evaluated to confirm whether wrinkles and pressed marks occur, such that film-forming processability was evaluated, and coating processability and moldability of the manufactured film were evaluated. Results thereof were shown in Table 3 below.

Example 2

A copolymerized polyester chip including, as components, 100 mol % terephthalic acid unit as an aromatic dicarboxylic acid component, 97 mol % ethylene glycol unit as a diol component, and 3 mol % neopentyl glycol unit, and having an intrinsic viscosity of 0.65 d/g, was manufactured.

The chip was melted in an extruder at 280° C., extruded through a T-die, rapidly cooled and solidified on a cooling roller having a surface temperature of 20° C., and simultaneously, the chip was allowed to be in close contact with a cooling roller by using a static electricity application method, thereby obtaining an amorphous non-stretched sheet.

The non-stretched film passed through a pre-heat roller, and was subjected to three-stage stretching, wherein total stretching of the film in MD was performed by 3.24 times, and then cooled in a cooling roller at 23° C. In stretching the film in MD, there were 3 stretching continuously subjected to one-stage stretching at 110° C. by 1.2 times, two-stage stretching at 113° C. by 1.5 times, and three-stage stretching at 102° C. by 1.8 times. The film was cooled in a cooling roller at 23° C. immediately after the three-stage stretching.

Here, a stretching ratio of the three-stage stretching section which is a rear end stretching section was 64% with regard to total stretching sections.

Then, the uniaxially stretched film was pre-heated in a tenter at 110° C. for 1.9 seconds, and stretched in TD at 145° C. by 4.0 times, followed by heat-setting at 232° C., and relaxing at a relaxation temperature of 210° C. in TD to perform relaxation treatment by 7.6%, thereby obtaining a biaxially stretched polyester film having a thickness of 30 μm.

Physical properties of the manufactured polyester film were measured and shown in Table 3 below. Further, appearance of the manufactured film was evaluated to confirm whether wrinkles and pressed marks occur, such that film-forming processability was evaluated, and coating processability and moldability of the manufactured film were evaluated. Results thereof were shown in Table 3 below.

Example 3

A copolymerized polyester chip including, as components, 100 mol % terephthalic acid unit as an aromatic dicarboxylic acid component, 95.2 mol % ethylene glycol unit as a diol component, and 4.8 mol % neopentyl glycol unit, and having an intrinsic viscosity of 0.67 dl/g, was manufactured.

The chip was melted in an extruder at 280° C., extruded through a T-die, rapidly cooled and solidified on a cooling roller having a surface temperature of 20° C., and simultaneously, the chip was allowed to be in close contact with a cooling roller by using a static electricity application method, thereby obtaining an amorphous non-stretched sheet.

The non-stretched film passed through a pre-heat roller, and was subjected to four-stage stretching, wherein total stretching of the film in MD was performed by 4.0 times, and then cooled in a cooling roller at 23° C. In stretching the film in MD, there were 4 stretching sections, wherein the pre-heat non-stretched film was continuously subjected to one-stage stretching at 90° C. by 1.1 times, two-stage stretching at 105° C. by 1.3 times, three-stage stretching at 113° C. by 1.4 times, and four-stage stretching at 105° C. by 2.0 times. The film was cooled in a cooling roller at 23° C. immediately after the four-stage stretching.

Here, a stretching ratio of the four-stage stretching section which is a rear end stretching section was 67% with regard to total stretching sections.

Then, the uniaxially stretched film was pre-heated in a tenter at 115° C. for 2.0 seconds, and stretched in TD at 138° C. by 3.7 times, followed by heat-setting at 237° C., and relaxing at a relaxation temperature of 200° C. in TD to perform relaxation treatment by 5.5%, thereby obtaining a biaxially stretched polyester film having a thickness of 50 μm.

Physical properties of the manufactured polyester film were measured and shown in Table 3 below. Further, appearance of the manufactured film was evaluated to confirm whether wrinkles and pressed marks occur, such that film-forming processability was evaluated, and coating processability and moldability of the manufactured film were evaluated. Results thereof were shown in Table 3 below.

Example 4

A copolymerized polyester chip (A) including, as components, 100 mol % terephthalic acid unit as an aromatic dicarboxylic acid component, 84 mol % ethylene glycol unit as a diol component, and 16 mol % neopentyl glycol unit, and having an intrinsic viscosity of 0.69 dl/g, was dried, and a homo polyethylene terephthalate chip (B) having an intrinsic viscosity of 0.65 dl/g, was dried, respectively. In addition, the chip (A) and the chip (B) were mixed at a mass ratio of 20:80 so that a content of neopentyl glycol in the film is 3.2 mol %.

Sequentially, the chip mixture was melted in an extruder at 280° C., extruded through a T-die, rapidly cooled and solidified on a cooling roller having a surface temperature of 20° C., and simultaneously, the chip mixture was allowed to be in close contact with a cooling roller by using a static electricity application method, thereby obtaining an amorphous non-stretched sheet.

The non-stretched film passed through a pre-heat roller, and was subjected to four-stage stretching, wherein total stretching of the film in MD was performed by 3.63 times, and then cooled in a cooling roller at 23° C. In stretching the film in MD, there were 4 stretching sections, wherein the pre-heat non-stretched film was continuously subjected to one-stage stretching at 85° C. by 1.1 times, two-stage stretching at 95° C. by 1.2 times, three-stage stretching at 115° C. by 2.5 times, and four-stage stretching at 102° C. by 1.1 times. The film was cooled in a cooling roller at 23° C. immediately after the four-stage stretching.

Here, a stretching ratio of the three-stage stretching section which is a rear end stretching section was 75% with regard to total stretching sections.

Then, the uniaxially stretched film was pre-heated in a tenter at 108° C. for 1.9 seconds, and stretched in TD at 140° C. by 3.8 times, followed by heat-setting at 228° C., and relaxing at a relaxation temperature of 180° C. in TD to perform relaxation treatment by 5%, thereby obtaining a biaxially stretched polyester film having a thickness of 30 μm.

Physical properties of the manufactured polyester film were measured and shown in Table 3 below. Further, appearance of the manufactured film was evaluated to confirm whether wrinkles and pressed marks occur, such that film-forming processability was evaluated, and coating processability and moldability of the manufactured film were evaluated. Results thereof were shown in Table 3 below.

Example 5

A copolymerized polyester chip (A) including, as components, 100 mol % terephthalic acid unit as an aromatic dicarboxylic acid component, 84 mol % ethylene A copolymerized polyester chip (A) including, as components, 100 mol % terephthalic acid unit as an aromatic dicarboxylic acid component, 76 mol % ethylene glycol unit as a diol component, and 24 mol % neopentyl glycol unit, and having an intrinsic viscosity of 0.69 dl/g, was dried, and a homo polyethylene terephthalate chip (B) having an intrinsic viscosity of 0.65 dl/g, was dried, respectively. In addition, the chip (A) and the chip (B) were mixed at a mass ratio of 4.5:95.5 so that a content of neopentyl glycol in the film is 1.08 mol %.

Sequentially, the chip mixture was melted in an extruder at 280° C., extruded through a T-die, rapidly cooled and solidified on a cooling roller having a surface temperature of 20° C., and simultaneously, the chip mixture was allowed to be in close contact with a cooling roller by using a static electricity application method, thereby obtaining an amorphous non-stretched sheet.

The non-stretched film passed through a pre-heat roller, and was subjected to three-stage stretching, wherein total stretching of the film in MD was performed by 2.9 times, and then cooled in a cooling roller at 23° C. In stretching the film in MD, there were 3 stretching sections, wherein the pre-heat non-stretched film was continuously subjected to one-stage stretching at 90° C. by 1.1 times, two-stage stretching at 116° C. by 2.4 times, and three-stage stretching at 100° C. by 1.1 times. The film was cooled in a cooling roller at 23° C. immediately after the three-stage stretching.

Here, a stretching ratio of the two-stage stretching section which is a rear end stretching section was 81% with regard to total stretching sections.

Then, the uniaxially stretched film was pre-heated in a tenter at 120° C. for 1.9 seconds, and stretched in TD at 145° C. by 4.3 times, followed by heat-setting at 220° C., and relaxing at a relaxation temperature of 230° C. in TD to perform relaxation treatment by 9.5%, thereby obtaining a biaxially stretched polyester film having a thickness of 100 μm.

Physical properties of the manufactured polyester film were measured and shown in Table 3 below. Further, appearance of the manufactured film was evaluated to confirm whether wrinkles and pressed marks occur, such that film-forming processability was evaluated, and coating processability and moldability of the manufactured film were evaluated. Results thereof were shown in Table 3 below.

Example 6

A copolymerized polyester chip (A) including, as components, 100 mol % terephthalic acid unit as an aromatic dicarboxylic acid component, 76 mol % ethylene glycol unit as a diol component, and 24 mol % neopentyl glycol unit, and having an intrinsic viscosity of 0.69 dl/g, was dried, and a homo polyethylene terephthalate chip (B) including having an intrinsic viscosity of 0.65 dl/g, was dried, respectively. In addition, the chip (A) and the chip (B) were mixed at a mass ratio of 20:80 so that a content of neopentyl glycol in the film is 4.8 mol %.

Sequentially, the chip mixture was melted in an extruder at 280° C., extruded through a T-die, rapidly cooled and solidified on a cooling roller having a surface temperature of 20° C., and simultaneously, the chip mixture was allowed to be in close contact with a cooling roller by using a static electricity application method, thereby obtaining an amorphous non-stretched sheet.

The non-stretched film passed through a pre-heat roller, and was subjected to four-stage stretching, wherein total stretching of the film in MD was performed by 4.63 times, and then cooled in a cooling roller at 23° C. In stretching the film in MD, there were 4 stretching sections, wherein the pre-heat non-stretched film was continuously subjected to one-stage stretching at 84° C. by 1.1 times, two-stage stretching at 96° C. by 1.2 times, three-stage stretching at 110° C. by 1.3 times, and four-stage stretching at 125° C. by 2.7 times. The film was cooled in a cooling roller at 23° C. immediately after the four-stage stretching.

Here, a stretching ratio of the four-stage stretching section which is a rear end stretching section was 80% with regard to total stretching sections.

Then, the uniaxially stretched film was pre-heated in a tenter at 102° C. for 2.5 seconds, and stretched in TD at 130° C. by 3.5 times, followed by heat-setting at 240° C., and relaxing at a relaxation temperature of 150° C. in TD to perform relaxation treatment by 1.5%, thereby obtaining a biaxially stretched polyester film having a thickness of 16 μm.

Physical properties of the manufactured polyester film were measured and shown in Table 3 below. Further, appearance of the manufactured film was evaluated to confirm whether wrinkles and pressed marks occur, such that film-forming processability was evaluated, and coating processability and moldability of the manufactured film were evaluated. Results thereof were shown in Table 3 below.

Example 7

A copolymerized polyester chip (A) including, as components, 100 mol % terephthalic acid unit as an aromatic dicarboxylic acid component, 84 mol % ethylene glycol unit as a diol component, and 16 mol % neopentyl glycol unit, and having an intrinsic viscosity of 0.69 dl/g, was dried, and a homo polyethylene terephthalate chip (B) having an intrinsic viscosity of 0.65 dl/g, was dried, respectively. In addition, the chip (A) and the chip (B) were mixed at a mass ratio of 25:75 so that a content of neopentyl glycol in the film is 4 mol %.

Sequentially, the chip mixture was melted in an extruder at 280° C., extruded through a T-die, rapidly cooled and solidified on a cooling roller having a surface temperature of 20° C., and simultaneously, the chip mixture was allowed to be in close contact with a cooling roller by using a static electricity application method, thereby obtaining an amorphous non-stretched sheet.

The non-stretched film passed through a pre-heat roller, and was subjected to first-stage stretching at 105° C., wherein total stretching of the film in MD was performed by 3.5 times, and then cooled in a cooling roller at 23° C.

Then, the uniaxially stretched film was pre-heated in a tenter at 110° C. for 1.9 seconds, and stretched in TD at 142° C. by 3.6 times, followed by heat-setting at 235° C., and relaxing at a relaxation temperature of 170° C. in TD to perform relaxation treatment by 3.5%, thereby obtaining a biaxially stretched polyester film having a thickness of 75 μm.

Physical properties of the manufactured polyester film were measured and shown in Table 3 below. Further, appearance of the manufactured film was evaluated to confirm whether wrinkles and pressed marks occur, such that film-forming processability was evaluated, and coating processability and moldability of the manufactured film were evaluated. Results thereof were shown in Table 3 below.

Comparative Example 1

A polyester film was manufactured by the same method as Example 1 above except for using 95 mol % ethylene glycol unit as a diol component, and 5 mol % neopentyl glycol unit.

Physical properties of the manufactured polyester film were measured and shown in Table 4 below. Further, appearance of the manufactured film was evaluated to confirm whether wrinkles and pressed marks occur, such that film-forming processability was evaluated, and coating processability and moldability of the manufactured film were evaluated. Results thereof were shown in Table 4 below.

Comparative Example 2

A polyester film was manufactured by the same method as Example 2 above except for changing the stretching ratio of the rear end stretching section in the stretching sections of the film in MD.

Specifically, the polyester film was manufactured by the same method as Example 2 above except that in three-stage stretching the film in MD having total stretching of 3.24 times, the film was subjected to one-stage stretching at 110° C. by 1.3 times, two-stage stretching at 113° C. by 1.5 times, and three-stage stretching at 102° C. by 1.66 times so that the stretching ratio of the three-stage stretching section which is a rear end stretching section is 58% with regard to total stretching sections.

Physical properties of the manufactured polyester film were measured and shown in Table 4 below. Further, appearance of the manufactured film was evaluated to confirm whether wrinkles and pressed marks occur, such that film-forming processability was evaluated, and coating processability and moldability of the manufactured film were evaluated. Results thereof were shown in Table 4 below.

Comparative Example 3

A polyester film was manufactured by the same method as Example 4 above except that the copolymerized polyester chip (A) and the polyethylene terephthalate chip (B) having an intrinsic viscosity of 0.65 dl/g were mixed at a mass ratio of 5.5:94.5 so that a content of neopentyl glycol in the film is 0.88 mol %.

Physical properties of the manufactured polyester film were measured and shown in Table 4 below. Further, appearance of the manufactured film was evaluated to confirm whether wrinkles and pressed marks occur, such that film-forming processability was evaluated, and coating processability and moldability of the manufactured film were evaluated. Results thereof were shown in Table 4 below.

Comparative Example 4

A polyester film was manufactured by the same method as Example 6 except for changing the stretching temperature, the heat treatment temperature, and the relaxation rate in the stretching section of the film in MD.

Specifically, the polyester film was manufactured by the same method as Example 6 above except that in stretching the film in MD, the film was subjected to one-stage stretching at 76° C. by 1.1 times, two-stage stretching at 78° C. by 1.2 times, three-stage stretching at 80° C. by 1.3 times, and four-stage stretching at 105° C. by 2.7 times, followed by heat-setting at 217° C. in a tenter, and relaxing in TD by 0.7%.

Physical properties of the manufactured polyester film were measured and shown in Table 4 below. Further, appearance of the manufactured film was evaluated to confirm whether wrinkles and pressed marks occur, such that film-forming processability was evaluated, and coating processability and moldability of the manufactured film were evaluated. Results thereof were shown in Table 4 below.

Comparative Example 5

A polyester film was manufactured by the same method as Example 3 above except for using 90 mol % ethylene glycol unit as a diol component, and 10 mol % neopentyl glycol unit.

Physical properties of the manufactured polyester film were measured and shown in Table 4 below. Further, appearance of the manufactured film was evaluated to confirm whether wrinkles and pressed marks occur, such that film-forming processability was evaluated, and coating processability and moldability of the manufactured film were evaluated. Results thereof were shown in Table 4 below.

TABLE 1

| | | Example 1 | Example 2 | Example 3 | Example 4 | Example 5 | Example 6 | Example 7 |
|---|---|---|---|---|---|---|---|---|
| Neopentyl glycol (mol %) | | 1.2 | 3.0 | 4.8 | 3.2 | 1.08 | 4.8 | 4.0 |
| Stretching (MD) | one-stage stretching | 110° C., 1.5 times | 110° C., 1.2 times | 90° C., 1.1 times | 85° C., 1.1 times | 90° C., 1.1 times | 84° C., 1.1 times | 105° C., 3.5 times |
| | two-stage stretching | 113° C., 2.0 times | 113° C., 1.5 times | 105° C., 1.3 times | 95° C., 1.2 times | 116° C., 2.4 times | 96° C., 1.2 times | — |
| | three-stage stretching | — | 102° C., 1.8 times | 113° C., 1.4 times | 115° C., 2.5 times | 100° C., 1.1 times | 110° C., 1.3 times | — |
| | four-stage stretching | — | — | 105° C., 2.0 times | 102° C., 1.1 times | — | 125° C., 2.7 times | — |
| | stretching ratio of rear end section | 75% | 64% | 67% | 75% | 81% | 80% | — |
| Pre-heating | | 108° C., 1.9 sec | 110° C., 1.9 sec | 115° C., 2.0 sec | 108° C., 1.9 sec | 120° C., 1.9 sec | 102° C., 2.5 sec | 110° C., 1.9 sec |
| Stretching (TD) | | 140° C., 4.0 times | 145° C., 4.0 times | 138° C., 3.7 times | 140° C., 3.8 times | 145° C., 4.3 times | 130° C., 3.5 times | 142° C., 3.6 times |
| Heat-setting temperature (° C.) | | 242 | 232 | 237 | 228 | 220 | 240 | 235 |
| Relaxing treatment (TD) | | 220° C., 9.5% | 210° C., 7.6% | 200° C., 5.5% | 180° C., 5.0% | 230° C., 9.5% | 150° C., 1.5% | 170° C., 3.5% |
| Film thickness (μm) | | 16 | 30 | 50 | 30 | 100 | 16 | 75 |

TABLE 2

|  |  | Comparative Example 1 | Comparative Example 2 | Comparative Example 3 | Comparative Example 4 | Comparative Example 5 |
|---|---|---|---|---|---|---|
| Neopentyl glycol (mol %) | | 5.0 | 3.0 | 0.88 | 4.8 | 10 |
| Stretching (MD) | one-stage stretching | 110° C., 1.5 times | 110° C., 1.3 times | 85° C., 1.1 times | 76° C., 1.1 times | 90° C., 1.1 times |
| | two-stage stretching | 113° C., 2.0 times | 113° C., 1.5 times | 95° C., 1.2 times | 78° C., 1.2 times | 105° C., 1.3 times |
| | three-stage stretching | — | 102° C., 1.66 times | 115° C., 2.5 times | 80° C., 1.3 times | 113° C., 1.4 times |
| | four-stage stretching | — | — | 102° C., 1.1 times | 105° C., 2.7 times | 105° C., 2.0 times |
| | stretching ratio of rear end section | 75% | 58% | 75% | 80% | 67% |
| Pre-heating | | 108° C., 1.9 sec | 110° C., 1.9 sec | 108° C., 1.9 sec | 102° C., 2.5 sec | 115° C., 2.0 sec |
| Stretching (TD) | | 140° C., 4.0 times | 145° C., 4.0 times | 140° C., 3.8 times | 130° C., 3.5 times | 138° C., 3.7 times |
| Heat-setting temperature (° C.) | | 242 | 232 | 228 | 217 | 237 |
| Relaxing treatment (TD) | | 220° C., 9.5% | 210° C., 7.6% | 180° C., 5.0% | 150° C., 0.7% | 200° C., 5.5% |
| Film thickness (μm) | | 16 | 30 | 30 | 16 | 50 |

TABLE 3

|  |  | Example 1 | Example 2 | Example 3 | Example 4 | Example 5 | Example 6 | Example 7 |
|---|---|---|---|---|---|---|---|---|
| F20 (kg/mm$^2$) | MD | 9.3 | 10.7 | 10.5 | 10.5 | 8.5 | 13.2 | 9.3 |
| | TD | 14.2 | 12.6 | 11.6 | 11.3 | 13.8 | 12.8 | 9.4 |
| F100 (kg/mm$^2$) | MD | 12.7 | 14.1 | 14.3 | 15.1 | 11.8 | 20.3 | 12.1 |
| | TD | 20.9 | 17.9 | 16.8 | 16.3 | 21.4 | 18.3 | 13.7 |
| Modulus variation (kg/mm$^2$) | MD | 4.3 | 4.3 | 4.8 | 5.8 | 4.1 | 8.9 | 3.5 |
| | TD | 8.4 | 6.6 | 6.5 | 6.3 | 9.5 | 6.9 | 5.4 |
| Heat shrinkage (%) | MD | 0.8 | 1.0 | 1.5 | 1.6 | 1.4 | 1.9 | 1.1 |
| | TD | 0.3 | 0.6 | 0.8 | 1.2 | 1.2 | 1.5 | 1.0 |
| Shrinkage stress in MD (N/mm$^2$) | Initial load (@ 0.65 N/mm$^2$) | 0.1 | 0.1 | −0.2 | 0.2 | 0.9 | 0.3 | 0.5 |
| | Initial load (@6.21 N/mm$^2$) | −3.7 | −5.1 | −4.9 | −4.6 | −3.5 | −4.8 | −5.3 |
| Plane orientation coefficient | | 0.1437 | 0.1424 | 0.1398 | 0.1415 | 0.1504 | 0.1372 | 0.1287 |
| Density (g/cm$^3$) | | 1.3936 | 1.3895 | 1.3846 | 1.3918 | 1.3952 | 1.3897 | 1.3906 |
| Melting point (° C.) | | 250.5 | 247.0 | 241.6 | 247.4 | 252.8 | 242.1 | 244.0 |
| Film appearance | | Good | Good | Good | Good | Good | Good | Good |
| Coating processability (%) | | 99.2 | 98.8 | 98.3 | 98.5 | 97.9 | 95.8 | 93.6 |
| Moldability (%) | | 98 | 99 | 100 | 100 | 98 | 100 | 100 |

TABLE 4

|  |  | Comparative Example 1 | Comparative Example 2 | Comparative Example 3 | Comparative Example 4 | Comparative Example 5 |
|---|---|---|---|---|---|---|
| F20 (kg/mm$^2$) | MD | 7.8 | 10.9 | 13.5 | 14.8 | 9.7 |
| | TD | 12.5 | 13.3 | 14.7 | 13.7 | 9.3 |
| F100 (kg/mm$^2$) | MD | 10.5 | 14.8 | 19.8 | 23.3 | 13.5 |
| | TD | 17.3 | 18.3 | 22.1 | 20.5 | 15.2 |
| Modulus variation (kg/mm$^2$) | MD | 3.4 | 4.9 | 7.9 | 10.6 | 4.8 |
| | TD | 6.0 | 6.3 | 9.3 | 8.5 | 7.4 |
| Heat shrinkage (%) | MD | 1.6 | 1.1 | 0.9 | 2.7 | 3.2 |
| | TD | 1.2 | 0.6 | 0.6 | 1.8 | 1.3 |
| Shrinkage stress in MD (N/mm$^2$) | Initial load (@ 0.65 N/mm$^2$) | 0.7 | 0.2 | 0.4 | 1.3 | 1.1 |

TABLE 4-continued

|  | Comparative Example 1 | Comparative Example 2 | Comparative Example 3 | Comparative Example 4 | Comparative Example 5 |
|---|---|---|---|---|---|
| Initial load (@ 6.21 N/mm$^2$) | −5.6 | −5.2 | −2.8 | −4.1 | −6.1 |
| Plane orientation coefficient | 0.1300 | 0.1439 | 0.1551 | 0.1528 | 0.1299 |
| Density (g/cm$^3$) | 1.3844 | 1.3894 | 1.3953 | 1.3897 | 1.3722 |
| Melting point (° C.) | 239.7 | 247.2 | 253.2 | 242.0 | 230.2 |
| Film appearance | Good | Defective | Good | Good | Good |
| Coating processability (%) | 72.0 | 0 | 98.3 | 79.2 | 8.3 |
| Moldability (%) | 100 | 0 | 65 | 41 | 100 |

As shown in Tables 3 and 4 above, it could be appreciated that Examples of the present invention satisfied physical properties, specifically, 20% tensile modulus (F20) of the film in MD and TD was 8 to 14.5 kg/mm$^2$, and 100% tensile modulus (F100) of the film in the MD and TD was 11 to 21.5 kg/mm$^2$, and heat shrinkage of the film in MD and TD after heat treatment at 150° C. for 30 minutes was 2% or less, such that coating processability and moldability were excellent.

However, it could be appreciated that Comparative Example 1 had an excessively low modulus in MD, such that wrinkles severely occurred by tension during the coating process, and thus, processability was poor.

In addition, Comparative Example 2 had a low stretching ratio of the rear end stretching during the stretching process in MD, such that pressed marks by a nip-roll during the film manufacturing process severely occurred, resulting in poor appearance. In addition, due to non-uniform coating by wrinkle occurrence at the time of the coating process, the tear of the mold product by delamination phenomenon of the sheet frequently occurred at the time of evaluating moldability.

It could be appreciated that Comparative Examples 3 and 4 had high modulus in MD and TD, such that tear of the polyester film frequently occurred at the time of molding, and accordingly, moldability was reduced.

It could be appreciated that Comparative Example 5 had high heat shrinkage, such that shrinkage in TD largely occurred at the time of the coating process, and further, Comparative Example 5 had low shrinkage stress, wrinkles occurred by tension provided in the film during the process, and accordingly, coating processability was reduced.

Therefore, it could be appreciated that the polyester film of the present invention has excellent processability and excellent moldability, such that productivity is high and it is possible to produce a product having an aesthetic appearance.

The invention claimed is:

1. A polyester film consisting of a copolymerized polyester alone or a mixture of a copolymerized polyester and a homo polyethylene terephthalate resin,
    wherein 20% tensile modulus F20 is 8.0 to 14.5 kg/mm$^2$, and 100% tensile modulus F100 is 11.0 to 21.5 kg/mm$^2$ in a machine direction and a transverse direction,
    a modulus variation A according to a tensile rate according to Equation 1 below in 20% to 100% of tensile section is 3 to 10 kg/mm$^2$:

$$A=(F100-F20)/0.8, \quad \text{[Equation 1]}$$

a heat shrinkage of the film in the machine direction and the transverse direction after heat treatment at 150° C. for 30 minutes is 2% or less, and
    moldability is 80% or more, and
    wherein the polyester film includes 1 to 4.8 mol % of neopentyl glycol unit, based on a total moles of diol components in the polyester film, and
    wherein the copolymerized polyester consists of a terephthalic acid unit, an ethylene glycol unit and the neopentyl glycol unit.

2. The polyester film of claim 1, wherein shrinkage stress in the machine direction after 100 seconds at 140° C. from an initial load of 6.21 N/mm$^2$ is −5.5 to −3.0 N/mm$^2$, and shrinkage stress in the machine direction after 100 seconds at 140° C. from an initial load of 0.65 N/mm$^2$ is −0.5 to 1.0 N/mm$^2$.

3. The polyester film of claim 1, wherein the polyester film has a melting point of 240 to 253° C.

4. The polyester film of claim 1, wherein the polyester film has a plane orientation coefficient of 0.120 to 0.155.

5. The polyester film of claim 1, wherein the polyester film has density of 1.384 to 1.397 g/cm$^3$.

6. The polyester film of claim 1, wherein the polyester film has a total thickness of 10 to 100 μm.

7. The polyester film of claim 1, wherein the polyester film has a surface concave-convex formed on at least any one surface by hair-line processing.

* * * * *